(12) United States Patent
Yanagi et al.

(10) Patent No.: US 11,072,348 B2
(45) Date of Patent: Jul. 27, 2021

(54) DRIVING ASSIST DEVICE, VEHICLE, INFORMATION PROVIDING DEVICE, DRIVING ASSIST SYSTEM, AND DRIVING ASSIST METHOD

(71) Applicant: TOYOTA JIDOSHA KABUSHIKI KAISHA, Toyota (JP)

(72) Inventors: Takuro Yanagi, Toyota (JP); Maki Tamura, Nisshin (JP); Mutsumi Matsuura, Okazaki (JP); Toshihiko Inoue, Toyota (JP); Naoki Yamamuro, Nagoya (JP); Takashi Hayashi, Aichi-gun (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 16/712,100

(22) Filed: Dec. 12, 2019

(65) Prior Publication Data

US 2020/0198655 A1   Jun. 25, 2020

(30) Foreign Application Priority Data

Dec. 21, 2018   (JP) .............................. JP2018-240119

(51) Int. Cl.
```
B60Q 1/00       (2006.01)
B60W 50/14      (2020.01)
B60W 40/09      (2012.01)
G06K 9/00       (2006.01)
```

(52) U.S. Cl.
CPC ............ *B60W 50/14* (2013.01); *B60W 40/09* (2013.01); *G06K 9/00791* (2013.01); *G06K 9/00832* (2013.01); *B60W 2050/146* (2013.01); *B60W 2554/00* (2020.02); *B60W 2556/65* (2020.02)

(58) Field of Classification Search
CPC .. B60W 50/14; B60W 40/09; B60W 2554/00; B60W 2556/65; B60W 2050/146; B60W 30/0953; B60W 30/0956; B60W 2554/4048; G06K 9/00791; G06K 9/00832; G06K 9/00845; B60R 1/00; B60R 2300/105; B60R 2300/8093; B60Q 9/008
USPC ................ 340/435, 436, 903, 988, 439, 457
See application file for complete search history.

(56) References Cited

U.S. PATENT DOCUMENTS

| | | | |
|---|---|---|---|
| 9,269,267 B2* | 2/2016 | Goodwin | G08G 1/162 |
| 2002/0198660 A1* | 12/2002 | Lutter | G08G 1/0965 |
| | | | 701/301 |
| 2017/0186320 A1* | 6/2017 | Lai | G08G 1/012 |

(Continued)

FOREIGN PATENT DOCUMENTS

| | | | |
|---|---|---|---|
| JP | 2004-145725 A | 5/2004 | |
| JP | 2014-534697 A | 12/2014 | |

(Continued)

*Primary Examiner* — Anh V La
(74) *Attorney, Agent, or Firm* — Oblon, McClelland, Maier & Neustadt, L.L.P.

(57) ABSTRACT

A driving assist device includes a control unit configured to acquire event position information that is position information about a vehicle when it is detected that a driver of the vehicle is in a looking aside state in the vehicle, as an event, and configured to present attention information calling for attention, to a driver who is driving toward a position indicated by the event position information.

20 Claims, 4 Drawing Sheets

(56) References Cited

U.S. PATENT DOCUMENTS

2019/0092236 A1   3/2019  Hayashi
2019/0256085 A1*  8/2019  Kim ..................... B60W 30/09

FOREIGN PATENT DOCUMENTS

JP        2017-211818 A    11/2017
WO    WO 2013/055513 A1    4/2013

* cited by examiner

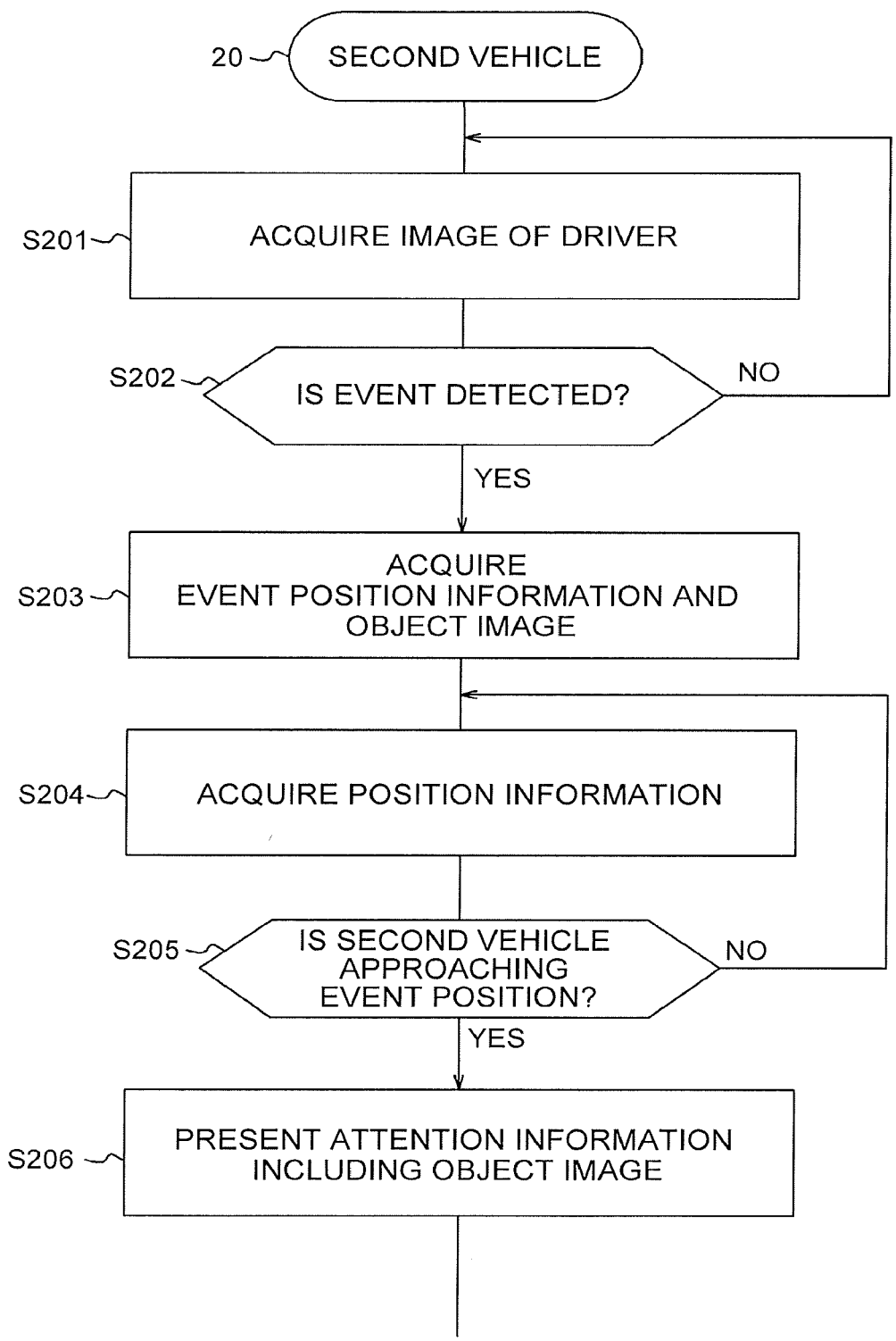

DRIVING ASSIST DEVICE, VEHICLE, INFORMATION PROVIDING DEVICE, DRIVING ASSIST SYSTEM, AND DRIVING ASSIST METHOD

INCORPORATION BY REFERENCE

The disclosure of Japanese Patent Application No. 2018-240119 filed on Dec. 21, 2018 including the specification, drawings and abstract is incorporated herein by reference in its entirety.

BACKGROUND

1. Technical Field

The disclosure relates to a driving assist device, a vehicle, an information providing device, a driving assist system, and a driving assist method.

2. Description of Related Art

Japanese Patent Application Publication No. 2004-145725 (JP 2004-145725 A) and Japanese Patent Application Publication No. 2017-211818 (JP 2017-211818 A) describe technologies for detecting that a driver is in a looking aside state.

SUMMARY

In the case where there is a spot on a road that attracts driver's attention, for example, in the case where there is a scenic spot, there is concern that the driver looks aside at the spot.

In the technology described in JP 2004-145725 A, when the possibility of collision of a vehicle with an obstacle forward of the vehicle is higher than a reference level, a collision alert is output. When it is detected that the driver is in a looking aside state, the reference level is corrected to a lower level. Even when it is not detected that the driver is in a looking aside state, the reference level is corrected to a lower level, in the case where it is determined that the driver is in a situation in which the driver is likely to look aside. However, in the case where the driver has not looked aside and where the driver is not in the situation in which the driver is likely to look aside, the collision alert is not output. In the case where there is no obstacle, the collision alert is not output, even when the driver is in the situation in which the driver is likely to look aside.

In the technology described in JP 2017-211818 A, a time for which the driver is looking aside and a traveling distance of the vehicle for which the driver is looking aside are calculated. The driver is notified of information of the calculated time and distance. However, in the case where the driver is not looking aside, there is no notice.

For enhancing safety of driving at a spot where the driver is likely to look aside, it is necessary to call driver's attention before the driver reaches such a spot.

The disclosure provides a technology for enhancing the safety of the driving at the spot where the driver is likely to look aside.

A driving assist device according to a first aspect of the disclosure includes a control unit configured to: acquire event position information that is position information about a first vehicle when it is detected that a driver of the first vehicle is in a looking aside state, as an event; and present attention information calling for attention, to a driver of a second vehicle who is driving toward a position indicated by the event position information.

A vehicle according to a second aspect of the disclosure includes: a driving assist device including a control unit configured to acquire event position information that is position information about a first vehicle when it is detected that a driver of the first vehicle is in a looking aside state, as an event, and present attention information calling for attention, to a driver of a second vehicle who is driving toward a position indicated by the event position information; and an output unit configured to output the attention information.

An information providing device according to a third aspect of the disclosure includes: a control unit configured to detect that a first driver of a vehicle is in a looking aside state, as an event, and acquire event position information that is position information about the first vehicle when the control unit has detected the event; and a communication unit configured to provide the event position information calling for attention, to a driver of a second vehicle who is driving toward a position indicated by the event position information acquired by the control unit.

A vehicle according to a fourth aspect of the disclosure includes: an information providing device including a control unit configured to detect that a driver of a first vehicle is in a looking aside state, as an event, acquire event position information that is position information about the first vehicle when the control unit has detected the event, and acquire an object image photographed from the first vehicle, the object image being an image that contains an object looked at by the driver in the looking aside state, and a communication unit configured to provide the event position information calling for attention, to a driver of a second vehicle who is driving toward a position indicated by the event position information acquired by the control unit, and provide the object image acquired by the control unit, for presenting the object image to the driver of the second vehicle who is driving toward the position indicated by the event position information; and a photographing unit configured to photograph the object image.

A driving assist system according to a fifth aspect of the disclosure includes: an information providing device including a control unit configured to detect that a driver of a first vehicle is in a looking aside state, as an event, and acquire event position information that is position information about the first vehicle when the control unit has detected the event; and a communication unit configured to provide the event position information acquired by the control unit; and a driving assist device configured to acquire the event position information from the information providing device, and present attention information calling for attention, to the driver of the second vehicle who is driving toward the position indicated by the event position information.

A driving assist method according to a sixth aspect of the disclosure includes: detecting, by a control unit, that a driver of a first vehicle is in a looking aside state, as an event; and outputting, by an output unit, attention information calling for attention, for presenting the attention information to a driver of a second vehicle who is driving toward a event position identical to a position of the first vehicle when the control unit has detected the event.

Above aspects enhance the safety of the driving at the spot where the driver is likely to look aside.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart showing a behavior of the driving assist system according to the second embodiment.

DETAILED DESCRIPTION OF EMBODIMENTS

Figure 1:
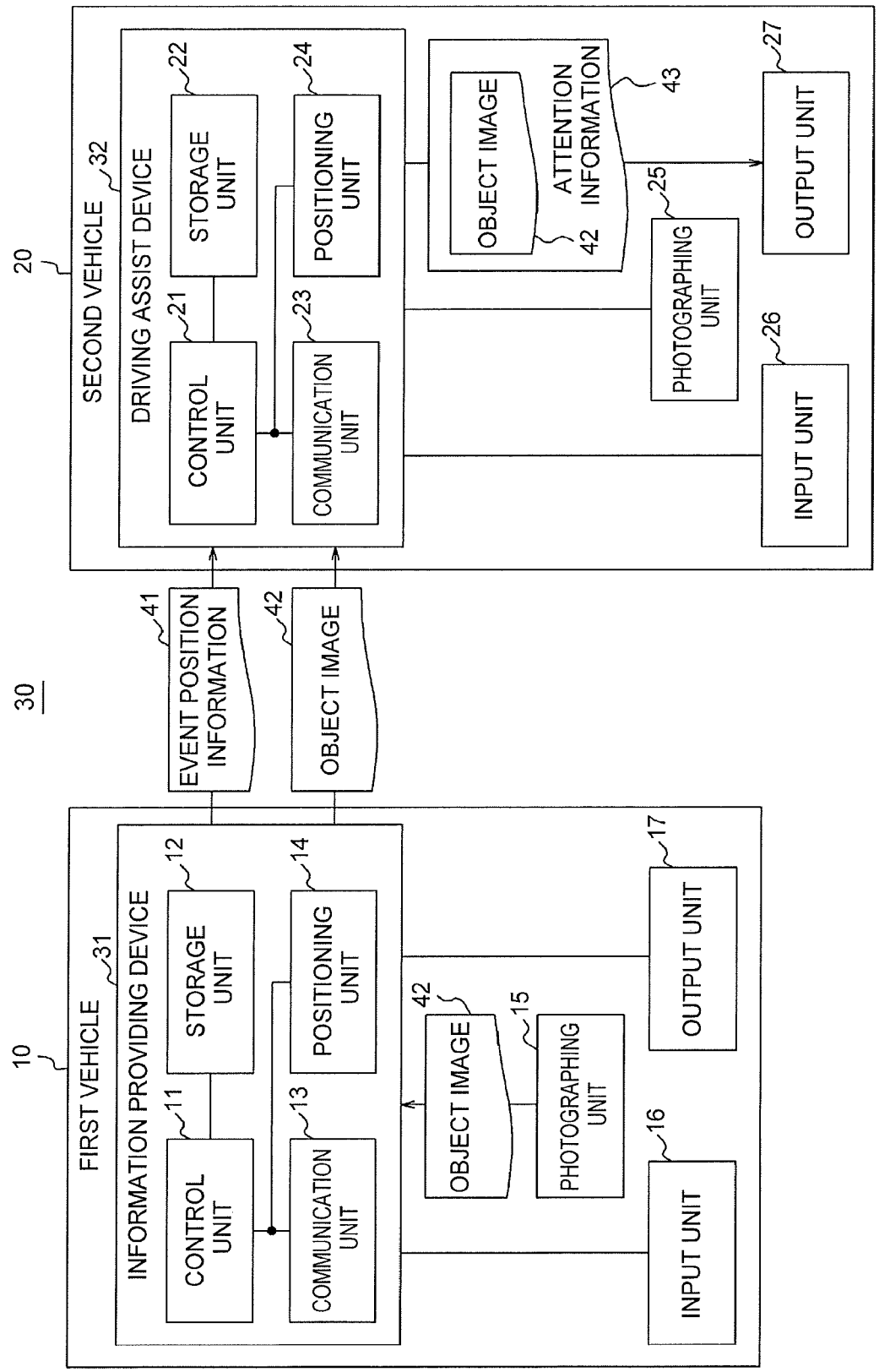
FIG. 1 is a block diagram showing a configuration of a driving assist system according to a first embodiment.

Hereinafter, embodiments of the disclosure will be described with reference to the drawings.

In the drawings, identical or equivalent parts are denoted by identical reference characters. In the description of the embodiments, descriptions of identical or equivalent parts are omitted or simplified when appropriate.

First Embodiment

An outline of a first embodiment will be described with reference to FIG. 1.

A control unit 11 of a first vehicle 10 detects that a driver of the first vehicle 10 is in a looking aside state in the first vehicle 10, as an event. An output unit 27 of a second vehicle 20 that is another vehicle different from the first vehicle 10 outputs attention information 43 calling for attention, for presenting the attention information 43 to a driver of the second vehicle 20 who is driving toward a position identical to the position of the first vehicle 10 when the control unit 11 of the first vehicle 10 has detected the event.

It can be said that a spot where the driver of the first vehicle 10 has looked aside is a spot where the driver of the second vehicle 20 is also likely to look aside. The driver of the second vehicle 20 sees or hears the attention information 43 output to the output unit 27, when driving toward the spot, and thereby can be cautious not to look aside in advance. Therefore, the embodiment enhances safety of driving at the spot where the driver is likely to look aside.

As the attention information 43, only an attention-calling message such as "Don't look aside ahead" may be presented. However, in the embodiment, an object image 42 that is an image containing a looked object is also presented. The object image 42 is photographed from the first vehicle 10. As the attention information 43, only the object image 42 may be presented. That is, the object image 42 may be presented as at least a part of the attention information 43.

When the driver of the second vehicle 20 is driving toward the spot where the driver of the first vehicle 10 has looked aside, the driver of the second vehicle 20 sees the object image 42 displayed on the output unit 27, and thereby can visually check the object looked by the driver of the first vehicle 10. Therefore, when the driver of the second vehicle 20 reaches the spot, the driver of the second vehicle 20 hardly has a wish to see the object or is not very impressed even when the driver of the second vehicle 20 sees the object, allowing driver's attentiveness to be kept. Accordingly, the embodiment further enhances the safety of the driving at the spot where the driver is likely to look aside.

The looked object is not limited to a scene such as Mount Fuji, and may be an object, a place or a phenomenon that attract driver's attention.

Each of the first vehicle 10 and the second vehicle 20 may be any type of vehicle. In the embodiment, each of the first vehicle 10 and the second vehicle 20 is an automobile. The relation between the first vehicle 10 and the second vehicle 20 is not limited to a one-to-one relation, and may be a one-to-many relation, a many-to-one relation, or a many-to-many relation.

A configuration of a driving assist system 30 according to the embodiment will be described with reference to FIG. 1.

The driving assist system 30 includes an information providing device 31 and a driving assist device 32.

The information providing device 31 is included in the first vehicle 10. The information providing device 31 may be configured as an in-vehicle apparatus such as a navigation device, or may be configured as an electronic apparatus to be used while being connected with an in-vehicle apparatus, for example, as a smartphone.

The information providing device 31 includes constituent elements such as the control unit 11, a storage unit 12, a communication unit 13 and a positioning unit 14.

The control unit 11 is constituted by one or more processors. As the processor, a general-purpose processor such as a CPU or a dedicated processor specialized for a particular process can be used. The "CPU" is an abbreviation of Central Processing Unit. The control unit 11 may include one or more dedicated circuits, or in the control unit 11, one or more processors may be replaced with one or more dedicated circuits. As the dedicated circuit, for example, a FPGA or an ASIC can be used. The "FPGA" is an abbreviation of Field-Programmable Gate Array. The "ASIC" is an abbreviation of Application Specific Integrated Circuit. The control unit 11 may include one or more ECUs. The "ECU" is an abbreviation of Electronic Control Unit. The control unit 11 executes information processing relevant to a behavior of the information providing device 31, while controlling each unit of the first vehicle 10 including the information providing device 31.

The storage unit 12 is constituted by one or more memories. As the memory, for example, a semiconductor memory, a magnetic memory or an optical memory can be used. The memory may function as a main storage device, an auxiliary storage device or a cache memory. In the storage unit 12, information to be used for the behavior of the information providing device 31 and information obtained by the behavior of the information providing device 31 are stored.

The communication unit 13 is constituted by one or more communication modules. As the communication module, for example, a communication module for DSRC, LTE, 4G or 5G can be used. The "DSRC" is an abbreviation of Dedicated Short Range Communications. The "LTE" is an abbreviation of Long Term Evolution. The "4G" is an abbreviation of 4th Generation. The "5G" is an abbreviation of 5th Generation. The communication unit 13 receives the information to be used for the behavior of the information providing device 31, and sends the information obtained by the behavior of the information providing device 31.

The positioning unit 14 is constituted by one or more positioning modules. As the positioning module, for example, a positioning module for GPS, QZSS, GLONASS or Galileo can be used. The "GPS" is an abbreviation of Global Positioning System. The "QZSS" is an abbreviation of Quasi-Zenith Satellite System. A satellite for QZSS is called a quasi-zenith satellite system. The "GLONASS" is an abbreviation of Global Navigation Satellite System. The positioning unit 14 acquires position information about the first vehicle 10.

A function of the information providing device 31 is realized when an information providing program according to the embodiment is executed by the processor included in the control unit 11. That is, the function of the information providing device 31 is realized by software. The information providing program is a program for causing a computer to realize a function corresponding to a step included in the behavior of the information providing device 31 by causing the computer to execute the step. That is, the information providing program is a program for causing the computer to function as the information providing device 31.

The program can be recorded in a computer-readable recording medium. As the computer-readable recording medium, for example, a magnetic recording device, an optical disk, a magneto-optical recording medium or a semiconductor memory can be used. The distribution of the program is performed, for example, by performing sale, transfer or rental of a portable recording medium such as a DVD or a CD-ROM in which the program is recorded. The "DVD" is an abbreviation of Digital Versatile Disc. The "CD-ROM" is an abbreviation of Compact Disc Read Only Memory. The program may be distributed by storing the program in a storage of a server and transmitting the program from the server to another computer through a network. The program may be provided as a program product.

For example, in a memory, the computer stores the program recorded in the portable recording medium or the program transmitted from the server, once. Then, the computer reads the program stored in the memory, with a processor, and executes a process in accordance with the read program, with the processor. The computer may read the program directly from the portable recording medium, and may execute the process in accordance with the program. The computer may execute the process in accordance with the received program, whenever the program is transmitted from the server to the computer. The computer may execute the process with a so-called ASP type service in which a function is realized only by execution instruction and result acquisition without the transmission of the program from the server to the computer. The "ASP" is an abbreviation of Application Service Provider. The program includes information that is used for a process by an electronic computer and that is equivalent to a program. For example, data having a property of not directly instructing the computer but specifying the process by the computer is included in the "information that is equivalent to a program".

Some or all of the functions of the information providing device 31 may be realized by a dedicated circuit included in the control unit 11. That is, some or all of the functions of the information providing device 31 may be realized by hardware.

The first vehicle 10 includes a photographing unit 15, an input unit 16 and an output unit 17, in addition to the information providing device 31. In the first vehicle 10, the photographing unit 15, the input unit 16 and the output unit 17 may constitute a part of the information providing device 31.

The photographing unit 15 is constituted by one or more in-vehicle cameras. As the in-vehicle camera, for example, a front camera, a side camera, a rear camera or a vehicle-interior camera can be used. The photographing unit 15 photographs an image from the first vehicle 10. That is, the photographing unit 15 photographs an image of the exterior of the first vehicle 10. The photographing unit 15 photographs also an image of the interior of the first vehicle 10, for example, an image of a driver's seat of the first vehicle 10.

The input unit 16 is constituted by one or more input interfaces. As the input interface, for example, a physical key, a capacitive key, a pointing device, a touch screen provided integrally with an in-vehicle display, or an in-vehicle microphone can be used. The input unit 16 accepts an input of the information to be used for the behavior of the information providing device 31, from a user such as the driver of the first vehicle 10.

The output unit 17 is constituted by one or more output interfaces. As the output interface, for example, an in-vehicle display or an in-vehicle speaker can be used. As the in-vehicle display, for example, an LCD or an organic EL display can be used. The "LCD" is an abbreviation of Liquid Crystal Display. The "EL" is an abbreviation of Electro Luminescence. The output unit 17 outputs the information obtained by the behavior of the information providing device 31, to the user.

The driving assist device 32 is included in the second vehicle 20. The driving assist device 32 may be configured as an in-vehicle apparatus such as a navigation device, or may be configured as an electronic apparatus to be used while being connected with an in-vehicle apparatus, for example, as a smartphone.

The driving assist device 32 includes constituent elements such as a control unit 21, a storage unit 22, a communication unit 23, and a positioning unit 24.

The control unit 21 is constituted by one or more processors. As the processor, a general-purpose processor such as a CPU or a dedicated processor specialized for a particular process can be used. The control unit 21 may include one or more dedicated circuits, or in the control unit 21, one or more processors may be replaced with one or more dedicated circuits. As the dedicated circuit, for example, a FPGA or an ASIC can be used. The control unit 21 may include one or more ECUs. The control unit 21 executes information processing relevant to a behavior of the driving assist device 32, while controlling each unit of the second vehicle 20 including the driving assist device 32.

The storage unit 22 is constituted by one or more memories. As the memory, for example, a semiconductor memory, a magnetic memory or an optical memory can be used. The memory may function as a main storage device, an auxiliary storage device or a cache memory. In the storage unit 22, information to be used for the behavior of the driving assist device 32 and information obtained by the behavior of the driving assist device 32 are stored.

The communication unit 23 is constituted by one or more communication modules. As the communication module, for example, a communication module for DSRC, LTE, 4G or 5G can be used. The communication unit 23 receives the information to be used for the behavior of the driving assist device 32, and sends the information obtained by the behavior of the driving assist device 32.

The positioning unit 24 is constituted by one or more positioning modules. As the positioning module, for example, a positioning module for GPS, QZSS, GLONASS or Galileo can be used. The positioning unit 24 acquires position information about the second vehicle 20.

A function of the driving assist device 32 is realized when a driving assist program according to the embodiment is executed by the processor included in the control unit 21. That is, the function of the driving assist device 32 is realized by software. The driving assist program is a program for causing a computer to realize a function corresponding to a step included in the behavior of the driving assist device 32 by causing the computer to execute the step. That is, the driving assist program is a program for causing the computer to function as the driving assist device 32.

Some or all of the functions of the driving assist device 32 may be realized by a dedicated circuit included in the control unit 21. That is, some or all of the functions of the driving assist device 32 may be realized by hardware.

The second vehicle 20 includes a photographing unit 25, an input unit 26 and an output unit 27, in addition to the driving assist device 32. In the second vehicle 20, the photographing unit 25, the input unit 26 and the output unit 27 may constitute a part of the driving assist device 32.

The photographing unit 25 is constituted by one or more in-vehicle cameras. As the in-vehicle camera, for example, a front camera, a side camera, a rear camera or a vehicle-interior camera can be used. The photographing unit 25 photographs an image from the second vehicle 20. That is, the photographing unit 25 photographs an image of the exterior of the second vehicle 20. The photographing unit 25 photographs also an image of the interior of the second vehicle 20, for example, an image of a driver's seat of the second vehicle 20.

The input unit 26 is constituted by one or more input interfaces. As the input interface, for example, a physical key, a capacitive key, a pointing device, a touch screen provided integrally with an in-vehicle display, or an in-vehicle microphone can be used. The input unit 26 accepts an input of the information to be used for the behavior of the driving assist device 32, from a user such as the driver of the second vehicle 20.

The output unit 27 is constituted by one or more output interfaces. As the output interface, for example, an in-vehicle display or an in-vehicle speaker can be used. As the in-vehicle display, for example, an LCD or an organic EL display can be used. The output unit 27 outputs the information obtained by the behavior of the driving assist device 32, to the user.

Figure 2:
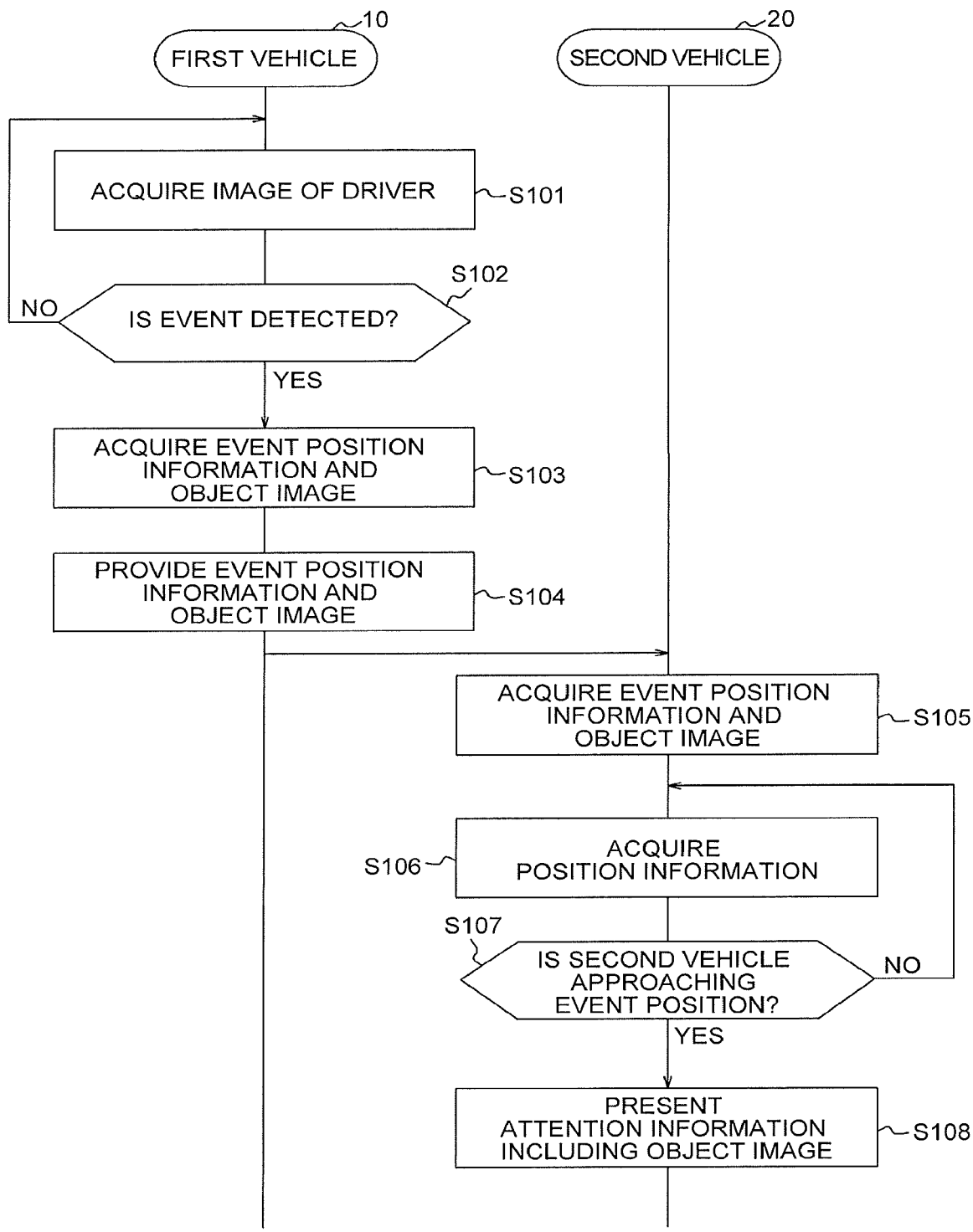
FIG. 2 is a flowchart showing a behavior of the driving assist system according to the first embodiment.

A behavior of the driving assist system 30 according to the embodiment will be described with reference to FIG. 2, in addition to FIG. 1. The behavior of the driving assist system 30 corresponds to a driving assist method according to the embodiment.

Processes in step S101 to step S104 are executed in the first vehicle 10.

In step S101, the control unit 11 of the information providing device 31 acquires an image of the driver of the first vehicle 10.

Specifically, from the photographing unit 15, the control unit 11 acquires an image containing the head and eyeball of the driver of the first vehicle 10, for example, an image of the driver's seat of the first vehicle 10.

In step S102, the control unit 11 detects that the driver of the first vehicle 10 is in a looking aside state in the first vehicle 10, as an event.

Specifically, the control unit 11 analyzes the image acquired in step S101, and calculates the sight line direction of the driver of the first vehicle 10. Then, the control unit 11 determines whether the driver of the first vehicle 10 is looking aside, depending on whether the sight line of the driver of the first vehicle 10 is being oriented to an object that the driver of the first vehicle 10 needs to watch, for example, to a particular region on a front windshield of the first vehicle 10, a door mirror, a back mirror, an instrument panel, or a navigation screen. As a technology for determining whether the driver is looking aside, which includes a technology for calculating the sight line direction from the image containing the head and eyeball of a human, any related technology can be used. For example, a technology described in JP 2004-145725 A or JP 2017-211818 A can be used.

In the case where the control unit 11 determines that the driver of the first vehicle 10 is looking aside, the control unit 11 may output a message calling for attention, to the driver of the first vehicle 10, through the output unit 17. This message may be displayed, or may be output by voice.

The processes in step S101 and step S102 are repeatedly executed until the control unit 11 detects the event. In the case where the control unit 11 detects the event, processes in step S103 and subsequent steps are executed.

In step S103, the control unit 11 acquires event position information 41. The event position information 41 is position information about the first vehicle 10 when the control unit 11 has detected the event.

In the embodiment, the control unit 11 further acquires the object image 42. The object image 42 is an image containing the object looked by the driver of the first vehicle 10, and is photographed from the first vehicle 10.

Specifically, the control unit 11 acquires the position information about the first vehicle 10 at the current time, from the positioning unit 14, as the event position information 41. For example, the position information indicates two-dimensional coordinates or three-dimensional coordinates of the current position of the first vehicle 10 that are obtained using GPS, QZSS, GLONASS, Galileo, or a combination of two or more of them. The control unit 11 acquires an image in the sight line direction calculated in step S102, from the photographing unit 15, as the object image 42. The control unit 11 stores the acquired event position information 41 in the storage unit 12, and stores the acquired object image 42 in the storage unit 12, in association with the event position information 41.

When the photographing unit 15 photographs the object image 42 from the first vehicle 10, the photographing unit 15, by control from the control unit 11, may automatically adjust a photographing direction such that the photographing direction roughly coincides with the sight line direction calculated in step S102. Alternatively, when the photographing unit 15 photographs the object image 42 from the first vehicle 10, the photographing unit 15, by control from the control unit 11, may select a photographing direction that roughly coincides with the sight line direction calculated in step S102, from a plurality of photographing directions such as a forward direction, lateral direction and rearward direction of the first vehicle 10.

The control unit 11 may perform a processing such as a cutting, a scaling or a resolution changing, to the object image 42 acquired from the photographing unit 15, and then may store the object image 42 after the processing, in the storage unit 12.

In step S104, the communication unit 13 of the information providing device 31 provides the event position information 41, to the driver of the second vehicle 20 who is driving toward the position indicated by the event position information 41 acquired by the control unit 11, calling for driver's attention.

In the embodiment, the communication unit 13 further provides the object image 42 acquired by the control unit 11, to the driver of the second vehicle 20 who is driving toward the position indicated by the event position information 41.

Specifically, the control unit 11 inputs the event position information 41 stored in the storage unit 12 and the object image 42 stored in the storage unit 12 and corresponding to the event position information 41, to the communication unit 13. The communication unit 13 sends the event position information 41 and object image 42 input from the control unit 11, to the driving assist device 32 of the second vehicle 20, by inter-vehicle communication, road-vehicle communication or communication via a network.

The communication unit 13 may provide the event position information 41 and the object image 42, through a server in a cloud computing system or another computing system.

Processes in step S105 to step S108 are executed in the second vehicle 20.

In step S105, the communication unit 23 of the driving assist device 32 acquires the event position information 41 provided from the information providing device 31 of the first vehicle 10.

In the embodiment, the communication unit 23 further acquires the object image 42 provided from the information providing device 31 of the first vehicle 10.

Specifically, the communication unit 23 receives the event position information 41 and object image 42 sent from the information providing device 31 of the first vehicle 10, by inter-vehicle communication, road-vehicle communication or communication via a network. From the communication unit 23, the control unit 21 acquires the event position information 41 and object image 42 received by the communication unit 23. The control unit 21 stores the acquired event position information 41 in the storage unit 22, and stores the acquired object image 42 in the storage unit 22, in association with the event position information 41.

In step S106, the control unit 21 of the driving assist device 32 acquires the position information about the second vehicle 20.

Specifically, the control unit 21 acquires the position information about the second vehicle 20 at the current time, from the positioning unit 24. For example, the position information indicates two-dimensional coordinates or three-dimensional coordinates of the current position of the second vehicle 20 that are obtained using GPS, QZSS, GLONASS, Galileo, or a combination of two or more of them.

In step S107, the control unit 21 determines whether the driver of the second vehicle 20 is driving toward the position indicated by the event position information 41 acquired by the communication unit 23. That is, the control unit 21 determines whether the second vehicle 20 is approaching the position indicated by the event position information 41.

Specifically, the control unit 21 calculates the distance between the current position of the second vehicle 20 that is indicated by the position information acquired in step S106 and the position that is indicated by the event position information 41 stored in the storage unit 22. The control unit 21 compares the calculated distance with a threshold. The threshold may be a fixed value such as one kilometer, may be value that is dynamically evaluated depending on the limiting speed of a road on which the second vehicle 20 is traveling, or may be a value that is dynamically evaluated depending on the speed of the second vehicle 20. In the case of a fixed value, the threshold may be a value that is selected depending on the type of the road on which the second vehicle 20 is traveling. For example, when the second vehicle 20 is traveling on a general road, the threshold is one kilometer, and when the second vehicle 20 is traveling on an expressway, the threshold is three kilometers. When the calculated distance is larger than the threshold, the control unit 21 determines that the second vehicle 20 is not approaching the position indicated by the event position information 41. When the calculated distance is smaller than the threshold, the control unit 21 determines that the second vehicle 20 is approaching the position indicated by the event position information 41, that is, the driver of the second vehicle 20 is driving toward the position indicated by the event position information 41.

The event position information 41 may include information indicating the moving direction of the first vehicle 10 when the event is detected. In that case, the control unit 21 determines the moving direction of the second vehicle 20, depending on change in the position indicated by the position information acquired in step S106. In the case where the calculated distance is smaller than the threshold and where the determined moving direction is the same as the moving direction indicated by the event position information 41, the control unit 21 determines that the second vehicle 20 is approaching the position indicated by the event position information 41.

The processes in step S106 and step S107 are repeatedly executed until the control unit 21 determines that the second vehicle 20 is approaching the position indicated by the event position information 41. In the case where the control unit 21 determines that the second vehicle 20 is approaching the position indicated by the event position information 41, the process in step S108 is executed.

In step S108, the control unit 21 presents the attention information 43 calling for attention, to the driver of the second vehicle 20. The control unit 21 uses the output unit 27, as means for presenting the attention information 43. That is, by control from the control unit 21, the output unit 27 outputs the attention information 43 for presentation to the driver of the second vehicle 20.

In the embodiment, the control unit 21 presents the object image 42 acquired by the communication unit 23, to the driver of the second vehicle 20, as at least a part of the attention information 43. The control unit 21 uses the output unit 27, as means for presenting the object image 42. That is, by control from the control unit 21, the output unit 27 displays the object image 42 acquired by the communication unit 23, for presenting the object image 42 to the driver of the second vehicle 20 as at least a part of the attention information 43.

Specifically, to the output unit 27, the control unit 21 inputs the object image 42 stored in the storage unit 22, as the attention information 43, together with an attention-calling message such as "Don't look aside ahead". The output unit 27 displays a screen that contains the attention information 43 input from the control unit 21. On this screen, the attention-calling message included in the attention information 43 is displayed as a text. On the same screen, an illustration such as an icon may be displayed at a position on a map that is indicated by the event position information 41. On the same map, another illustration such as an icon may be displayed at the current position of the second vehicle 20. Information amount on the screen is adjusted to a moderate amount, so as not to cause an unsafe driving. For example, the attention-calling message included in the attention information 43 may be output by voice, instead of being displayed as a text.

The length of a time for which the screen containing the attention information 43 is displayed may be a fixed time such as 30 seconds, or may be a time that is dynamically decided depending on the position of the second vehicle 20. In the case where the length of the time for which the screen containing the attention information 43 is displayed is dynamically decided depending on the position of the second vehicle 20, the length of the time may be a time before the second vehicle 20 reaches the position indicated by the event position information 41. In order not to cause an unsafe driving, the screen containing the attention information 43 may be displayed only in the case where the speed of the second vehicle 20 is lower than a specified value, as exemplified by a case where the second vehicle 20 is in a stop state.

The attention-calling message may be a message indicating the looked object, for example, a message "Mount Fuji will appear ahead; Keep safe driving without looking aside".

In that case, in step S103, the control unit 11 of the information providing device 31 of the first vehicle 10 analyzes the object image 42, and recognizes the object looked by the driver of the first vehicle 10. As a technology for recognizing the object in the image, for example, an image recognition technology with machine learning can be used. The control unit 11 generates a message indicating the recognized object. In step S104, in addition to the event position information 41, the communication unit 13 of the information providing device 31 provides the object image 42, as the attention information 43, to the driving assist device 32 of the second vehicle 20, together with the message generated by the control unit 11. In step S105, the communication unit 23 of the driving assist device 32 acquires the event position information 41 and attention information 43 provided from the information providing device 31 of the first vehicle 10. In the case where the control unit 21 of the driving assist device 32 determines in step S107 that the second vehicle 20 is approaching the position indicated by the event position information 41, the control unit 21 presents the attention information 43 acquired by the communication unit 23, to the driver of the second vehicle 20, in step S108.

As described above, in the embodiment, the control unit 11 of the information providing device 31 detects that the driver of the first vehicle 10 is in a looking aside in the first vehicle 10, as an event. The control unit 11 acquires the event position information 41 that is the position information about the first vehicle 10 when the control unit 11 has detected the event. The communication unit 13 of the information providing device 31 provides the event position information 41, to the driver of the second vehicle 20 who is driving toward the position indicated by the event position information 41 acquired by the control unit 11, calling for driver's attention. The control unit 21 of the driving assist device 32 acquires the event position information 41. The control unit 21 presents the attention information 43 calling for attention, to the driver of the second vehicle 20, before the second vehicle 20 reaches the position indicated by the event position information 41. Accordingly, the embodiment enhances the safety of the driving at the spot where the driver is likely to look aside.

In the embodiment, the control unit 11 of the information providing device 31 acquires the object image 42 that is an image containing the looked object and that is photographed from the first vehicle 10. The communication unit 13 of the information providing device 31 provides the object image 42 acquired by the control unit 11, for presenting the object image 42 to the driver of the second vehicle 20 who is driving toward the position indicated by the event position information 41. The control unit 21 of the driving assist device 32 presents the object image 42 to the driver of the second vehicle 20, as at least a part of the attention information 43. Accordingly, the embodiment further enhances the safety of the driving at the spot where the driver is likely to look aside.

When the second vehicle 20 is in a fully automatic driving mode, the control unit 21 of the driving assist device 32 does not need to present the attention information 43 including the object image 42, to the driver of the second vehicle 20. The fully automatic driving mode corresponds to "Level 5" in a level classification for SAE, but may include "Level 4" or may include an automatic driving level for another definition. The "SAE" is an abbreviation of Society of Automotive Engineers.

The information providing device 31 may be configured as a server in a cloud computing system or another computing system. In that case, the processes in step S101 to step S104 are executed by the server. Information necessary for the processes in step S101 to step S104, as exemplified by the image of the driver of the first vehicle 10, the position information about the first vehicle 10, or the image in the photographing direction that roughly coincides with the sight line direction of the driver of the first vehicle 10 may be uploaded from the first vehicle 10 to the server. The event position information 41 and the object image 42 may be delivered from the server to the second vehicle 20.

Second Embodiment

Figure 3:
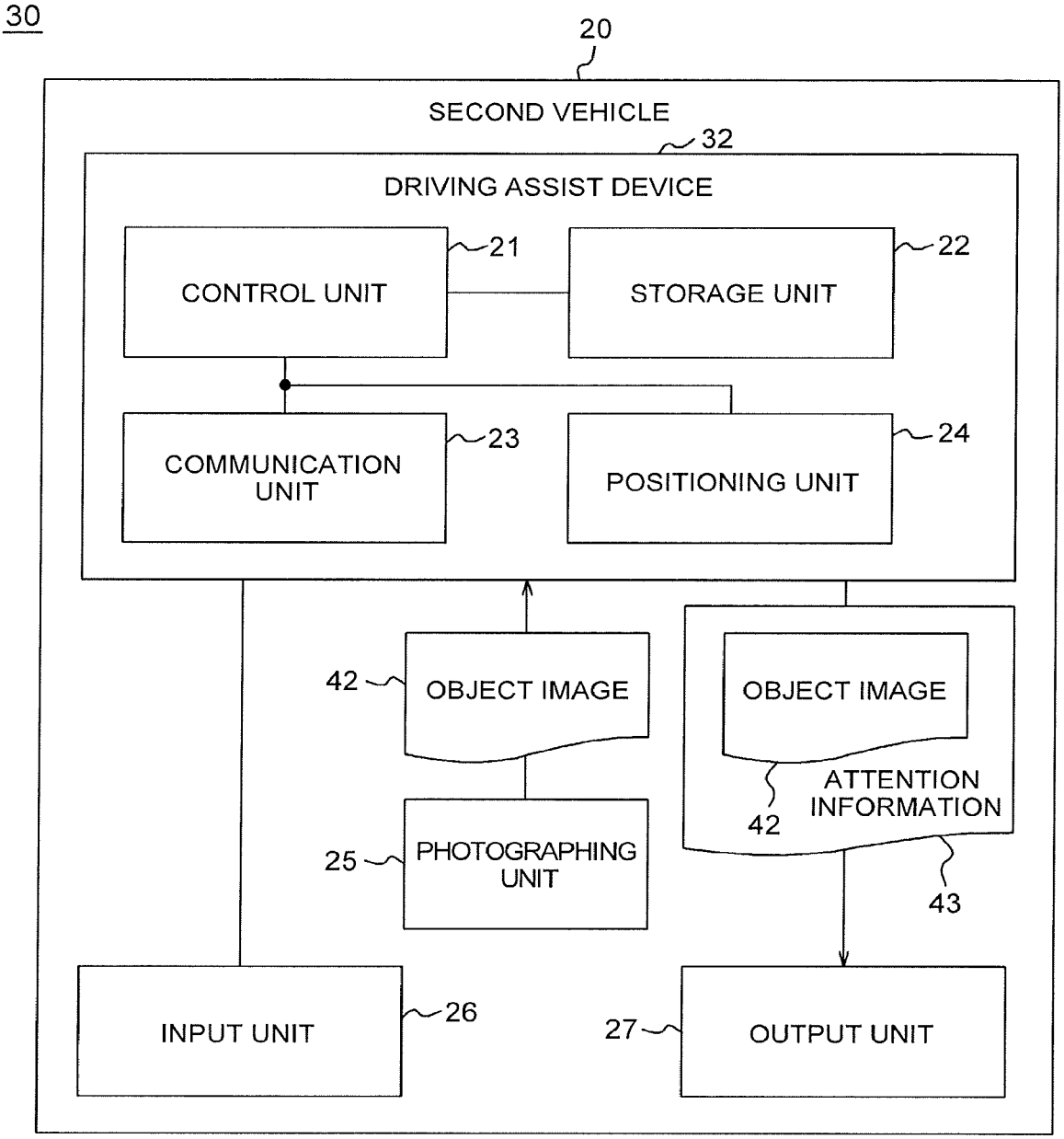
FIG. 3 is a block diagram showing a configuration of a driving assist system according to a second embodiment.

An outline of a second embodiment will be described with reference to FIG. 3.

In the first embodiment, the control unit 11 of the first vehicle 10 detects that the driver of the first vehicle 10 is in a looking aside state in the first vehicle 10. On the other hand, in the second embodiment, the control unit 21 of the second vehicle 20 detects that the driver of the second vehicle 20 is in a looking aside state in the second vehicle 20, as an event. The output unit 27 of the second vehicle 20 outputs the attention information 43 calling for attention, for presenting the attention information 43 to the driver of the second vehicle 20 who is driving toward a position identical to the position of the second vehicle 20 when the control unit 21 has detected the event, at a different timing from the time of the detection of the event.

It can be said that a spot where the driver of the second vehicle 20 has looked aside in the past is a spot where the driver of the second vehicle 20 is likely to look aside again. The driver of the second vehicle 20 sees or hears the attention information 43 output to the output unit 27, when driving toward the spot again, and thereby can be cautious not to look aside in advance. Therefore, the embodiment enhances the safety of the driving at the spot where the driver is likely to look aside.

The first vehicle 10 in the first embodiment is unnecessary, and therefore the second vehicle 20 may be referred to as merely the "vehicle".

A configuration of a driving assist system 30 according to the embodiment will be described with reference to FIG. 3. Descriptions of common parts with the first embodiment will be omitted or simplified when appropriate.

The driving assist system 30 includes the driving assist device 32. The driving assist system 30 does not need to include the information providing device 31 in the first embodiment.

Similarly to the first embodiment, the driving assist device 32 is included in the second vehicle 20.

Similarly to the first embodiment, the second vehicle 20 includes the photographing unit 25, the input unit 26 and the output unit 27, in addition to the driving assist device 32.

A behavior of the driving assist system 30 according to the embodiment will be described with reference to FIG. 4, in addition to FIG. 3. Descriptions of common parts with the first embodiment will be omitted or simplified when appropriate. The behavior of the driving assist system 30 corresponds to a driving assist method according to the embodiment.

Processes in step S201 to step S206 are executed in the second vehicle 20.

Processes in step S201 to step S203 are the same as the processes in step S101 to step S103, except that the first vehicle 10 and the control unit 11, storage unit 12, positioning unit 14 and photographing unit 15 of the information providing device 31 are replaced with the second vehicle 20 and the control unit 21, storage unit 22, positioning unit 24 and photographing unit 25 of the driving assist device 32, and therefore descriptions of the processes in step S201 to step S203 are omitted.

A process in step S204 is the same as the process in step S106, and therefore descriptions of the process in step S204 are omitted.

A process in step S205 is the same as the process in step S107, except that position information acquired in the interior of the second vehicle 20 in step 203 is used as the event position information 41 instead of the position information received from the exterior of the second vehicle 20, and therefore descriptions of the process in step S205 are omitted.

A process in step S206 is the same as the process in step S108, except that an image acquired in the interior of the second vehicle 20 in step S203 is used as the object image 42 instead of the image received from the exterior of the second vehicle 20, and therefore descriptions of the process in step S206 are omitted.

Instead of storing the acquired event position information 41 and object image 42 in the storage unit 22, the control unit 21 may store the event position information 41 and the object image 42 in a storage in the exterior of the second vehicle 20, for example, in a cloud storage, and may acquire the event position information 41 and the object image 42 through the communication unit 23, to use the event position information 41 and the object image 42.

As described above, in the embodiment, the control unit 21 of the driving assist device 32 detects that the driver of the second vehicle 20 is in a looking aside state in the second vehicle 20, as an event. The control unit 21 acquires the event position information 41 that is the position information about the second vehicle 20 when the control unit 21 has detected the event. The control unit 21 presents the attention information 43 calling for attention, to the driver of the second vehicle 20, before the second vehicle 20 reaches the position indicated by the event position information 41, at a different timing from the time of the detection of the event. For example, when the second vehicle 20 travels again through the spot of occurrence of the event after a certain period has elapsed since the occurrence of the event in the second vehicle 20, the control unit 21 presents the attention information 43 to the driver of the second vehicle 20. Accordingly, the embodiment enhances the safety of the driving at the spot where the driver is likely to look aside.

In the embodiment, the control unit 21 of the driving assist device 32 acquires the object image 42 that is an image containing the looked object and that is photographed from the second vehicle 20. The control unit 21 presents the object image 42, as at least a part of the attention information 43, to the driver of the second vehicle 20, before the second vehicle 20 reaches the position indicated by the event position information 41, at a different timing from the time of the detection of the event. For example, when the second vehicle 20 travels again through the spot of the occurrence of the event after a certain period has elapsed since the occurrence of the event in the second vehicle 20, the control unit 21 presents the object image 42 to the driver of the second vehicle 20. Accordingly, the embodiment further enhances the safety of the driving at the spot where the driver is likely to look aside.

The disclosure is not limited to the above-described embodiments. For example, a plurality of blocks described in the block diagrams may be integrated, and a single block may be divided. A plurality of steps described in the flowcharts, instead of being executed in chronological order as described, may be executed in parallel or in a different order, depending on processing powers of devices to execute the steps or as necessary.

What is claimed is:

1. A driving assist device comprising a control unit configured to:
   acquire event position information that is position information about a first vehicle when it is detected that a driver of the first vehicle is in a looking aside state, as an event; and
   present attention information calling for attention, to a driver of a second vehicle who is driving toward a position indicated by the event position information.

2. The driving assist device according to claim 1, wherein the control unit is configured to present the attention information to the driver of the second vehicle, before the second vehicle reaches the position indicated by the event position information.

3. The driving assist device according to claim 1, wherein the control unit is configured to:
   detect the event, and
   present the attention information to the driver of the second vehicle, at a different timing from a time of detection of the event, before the second vehicle reaches the position indicated by the event position information.

4. The driving assist device according to claim 1, wherein the control unit is configured to present an object image photographed from the first vehicle, as at least a part of the attention information, the object image being an image that contains an object looked at by the driver in the looking aside state.

5. The driving assist device according to claim 2, wherein the control unit is configured to present an object image photographed from the first vehicle, as at least a part of the attention information, the object image being an image that contains an object looked at by the driver in the looking aside state.

6. The driving assist device according to claim 3, wherein the control unit is configured to present an object image photographed from the first vehicle, as at least a part of the attention information, the object image being an image that contains an object looked at by the driver in the looking aside state.

7. A vehicle comprising:
   a driving assist device including a control unit configured to
      acquire event position information that is position information about a first vehicle when it is detected that a driver of the first vehicle is in a looking aside state, as an event, and
      present attention information calling for attention, to a driver of a second vehicle who is driving toward a position indicated by the event position information; and
   an output unit configured to output the attention information.

8. The vehicle according to claim 7, wherein the control unit is configured to present the attention information to the driver of the second vehicle, before the second vehicle reaches the position indicated by the event position information.

9. The vehicle according to claim 7, wherein the control unit is configured to:
- detect the event; and
- present the attention information to the driver of the second vehicle, at a different timing from a time of detection of the event, before the second vehicle reaches the position indicated by the event position information.

10. An information providing device comprising:
- a control unit configured to
  - detect that a first driver of a vehicle is in a looking aside state, as an event, and
  - acquire event position information that is position information about the first vehicle when the control unit has detected the event; and
- a communication unit configured to provide the event position information calling for attention, to a driver of a second vehicle who is driving toward a position indicated by the event position information acquired by the control unit.

11. The information providing device according to claim 10, wherein:
- the control unit is configured to acquire an object image photographed from the vehicle, the object image being an image that contains an object looked at by the driver in the looking aside state; and
- the communication unit is configured to provide the object image acquired by the control unit, for presenting the object image to the driver of the second vehicle who is driving toward the position indicated by the event position information.

12. A vehicle comprising:
- an information providing device including
  - a control unit configured to
    - detect that a driver of a first vehicle is in a looking aside state, as an event,
    - acquire event position information that is position information about the first vehicle when the control unit has detected the event, and
    - acquire an object image photographed from the first vehicle, the object image being an image that contains an object looked at by the driver in the looking aside state, and
  - a communication unit configured to
    - provide the event position information calling for attention, to a driver of a second vehicle who is driving toward a position indicated by the event position information acquired by the control unit, and
    - provide the object image acquired by the control unit, for presenting the object image to the driver of the second vehicle who is driving toward the position indicated by the event position information; and
- a photographing unit configured to photograph the object image.

13. A driving assist system comprising:
- an information providing device including
  - a control unit configured to
    - detect that a driver of a first vehicle is in a looking aside state, as an event, and
    - acquire event position information that is position information about the first vehicle when the control unit has detected the event; and
  - a communication unit configured to provide the event position information acquired by the control unit; and
- a driving assist device configured to
  - acquire the event position information from the information providing device, and
  - present attention information calling for attention, to the driver of the second vehicle who is driving toward the position indicated by the event position information.

14. The driving assist system according to claim 13, wherein:
- the control unit is configured to acquire an object image photographed from the first vehicle, the object image being an image that contains an object looked at by the driver in the looking aside state; and
- the communication unit is configured to provide the object image acquired by the control unit, for presenting the object image to the driver of the second vehicle who is driving toward the position indicated by the event position information.

15. A driving assist method comprising:
- detecting, by a control unit, that a driver of a first vehicle is in a looking aside state, as an event; and
- outputting, by an output unit, attention information calling for attention, for presenting the attention information to a driver of a second vehicle who is driving toward a event position identical to a position of the first vehicle when the control unit has detected the event.

16. The driving assist method according to claim 15, wherein
- the outputting outputs the attention information such that the attention information is presented to the driver of the second vehicle, before the second vehicle reaches the event position.

17. The driving assist method according to claim 15, further comprising detecting the event, wherein
- the outputting outputs the attention information such that the attention information is presented to the driver of the second vehicle, at a different timing from a time of detection of the event, before the second vehicle reaches the event position.

18. The driving assist method according to claim 15, wherein
- the outputting outputs an object image photographed from the first vehicle, as at least a part of the attention information, the object image being an image that contains an object looked at by the driver in the looking aside state.

19. The driving assist method according to claim 16, wherein
- the outputting outputs an object image photographed from the first vehicle, as at least a part of the attention information, the object image being an image that contains an object looked at by the driver in the looking aside state.

20. The driving assist method according to claim 17, wherein
- the outputting outputs an object image photographed from the first vehicle, as at least a part of the attention information, the object image being an image that contains an object looked at by the driver in the looking aside state.

\* \* \* \* \*